(12) United States Patent
Hovde

(10) Patent No.: US 10,982,644 B2
(45) Date of Patent: Apr. 20, 2021

(54) ENERGY HARVESTING DEVICE

(71) Applicant: APL TECHNOLOGY AS, Kolbjørnsvik (NO)

(72) Inventor: Geir Olav Hovde, His (NO)

(73) Assignee: APL Technology AS, Kolbjørnsvik (NO)

( * ) Notice: Subject to any disclaimer, the term of this patent is extended or adjusted under 35 U.S.C. 154(b) by 0 days.

(21) Appl. No.: 16/626,104

(22) PCT Filed: Jun. 29, 2018

(86) PCT No.: PCT/NO2018/000014
§ 371 (c)(1),
(2) Date: Dec. 23, 2019

(87) PCT Pub. No.: WO2019/009730
PCT Pub. Date: Jan. 10, 2019

(65) Prior Publication Data
US 2020/0208602 A1    Jul. 2, 2020

(30) Foreign Application Priority Data

Jul. 6, 2017 (NO) .................................... 20171115

(51) Int. Cl.
*F03B 13/18* (2006.01)
*F03B 17/06* (2006.01)
(Continued)

(52) U.S. Cl.
CPC .......... *F03B 13/183* (2013.01); *F03B 17/063* (2013.01); *F03D 3/005* (2013.01);
(Continued)

(58) Field of Classification Search
CPC ...... F03B 13/183; F03B 17/063; F03D 3/005; F03D 3/061; F03D 3/065; F05B 2210/16; F05B 2240/30
(Continued)

(56) References Cited

U.S. PATENT DOCUMENTS 4,005,947 A * 2/1977 Norton .................... F03D 3/007
                                                416/197 A
4,052,134 A * 10/1977 Rumsey ................. F03D 3/067
                                                416/119
(Continued)

FOREIGN PATENT DOCUMENTS

DE       39 28 538 A1    3/1991
GB         840543 A      7/1960
(Continued)

OTHER PUBLICATIONS

International Searching Authority, International Search Report in International Application No. PCT/NO2018/000014, dated Oct. 24, 2018.
(Continued)

*Primary Examiner* — Pedro J Cuevas
(74) *Attorney, Agent, or Firm* — Leydig, Voit & Mayer, Ltd.

(57) ABSTRACT

A power harvesting device comprising at least one rotor mounted rotatably on a corresponding fixture on a base structure is disclosed. The device is at least partially submerged in a moving fluid and arranged to convert tangential components of fluid dynamic forces of the moving fluid into a first torque component onto the rotor through rotor vanes. In addition, rotor blades are arranged on or between the first rotor vanes to deflect axially moving fluid into a tangential direction to create a second torque component onto the rotor in the same direction as said first torque component. A (Continued)

system comprising a plurality of power harvesting devices with common power transfer means is also disclosed.

5 Claims, 5 Drawing Sheets

(51) Int. Cl.
  *F03D 3/00* (2006.01)
  *F03D 3/06* (2006.01)
(52) U.S. Cl.
  CPC ............. *F03D 3/061* (2013.01); *F03D 3/065* (2013.01); *F05B 2210/16* (2013.01); *F05B 2240/30* (2013.01)
(58) Field of Classification Search
  USPC .......................... 290/53; 415/4.2; 416/197 A
  See application file for complete search history.

(56) References Cited

U.S. PATENT DOCUMENTS

| | | | | |
|---|---|---|---|---|
| 4,245,958 | A * | 1/1981 | Ewers ................. | F03D 7/06 416/197 A |
| 4,382,191 | A | 5/1983 | Potter | |
| 4,718,822 | A * | 1/1988 | Riezinstein ............. | F03D 7/06 416/119 |
| 4,720,239 | A | 1/1988 | Owczarek | |
| 4,926,061 | A * | 5/1990 | Arreola, Jr. .............. | F03D 3/02 290/55 |
| 5,037,268 | A | 8/1991 | Fenlon | |
| 5,336,933 | A * | 8/1994 | Ernster .................. | F03D 3/005 290/44 |
| 5,997,252 | A * | 12/1999 | Miller .................... | F03D 3/005 416/197 A |
| 6,582,291 | B2 * | 6/2003 | Clark .................... | F23L 17/10 454/19 |
| 6,929,671 | B2 * | 8/2005 | Kim ....................... | F03D 9/25 55/385.1 |
| 6,966,747 | B2 * | 11/2005 | Taylor ................... | F03D 13/20 415/1 |
| 7,008,171 | B1 * | 3/2006 | Whitworth .............. | F03D 9/25 415/4.2 |
| 7,056,082 | B1 * | 6/2006 | Taylor .................. | F03D 3/049 415/4.2 |
| 7,287,954 | B2 * | 10/2007 | Kinkaid ................. | F03D 3/061 415/4.2 |
| 7,696,635 | B2 * | 4/2010 | Boone ................... | F03D 3/067 290/55 |
| 7,766,600 | B1 * | 8/2010 | Vanderhye ............ | B63H 13/00 415/4.2 |
| 7,896,608 | B2 * | 3/2011 | Whitworth ............ | F03D 3/0436 415/4.2 |
| 7,944,075 | B2 * | 5/2011 | Boone ................... | F03D 13/20 290/55 |
| 8,011,876 | B2 * | 9/2011 | Gradwohl ............. | F03D 3/0481 415/4.2 |
| 8,061,993 | B2 * | 11/2011 | Sassow .................. | F03D 3/005 416/176 |
| 8,164,210 | B2 * | 4/2012 | Boone ................... | F03D 13/20 290/55 |
| 8,322,992 | B2 * | 12/2012 | Fuller .................... | F03D 3/062 416/197 A |
| 8,344,538 | B2 * | 1/2013 | Desplats ................ | F03D 1/02 290/55 |
| 8,360,713 | B2 * | 1/2013 | Carosi .................. | F03D 13/20 415/4.2 |
| 8,368,243 | B1 * | 2/2013 | Holden ................. | F03D 9/45 290/55 |
| 8,522,435 | B2 * | 9/2013 | Sassow ................. | F03D 3/005 29/889.7 |
| 8,604,635 | B2 * | 12/2013 | Boone ................... | F03D 3/005 290/55 |
| 8,678,768 | B2 * | 3/2014 | Sassow .................. | F03D 3/064 416/176 |
| 8,847,425 | B2 * | 9/2014 | Jordan, Sr. ............. | F03D 9/25 290/55 |
| 8,864,440 | B2 * | 10/2014 | Sauer, Jr. ............. | F03D 3/04 415/4.2 |
| 8,905,704 | B2 * | 12/2014 | Sauer .................... | F03D 3/065 415/4.2 |
| 8,961,103 | B1 * | 2/2015 | Wolff .................... | F03D 3/02 415/4.2 |
| 9,062,655 | B2 * | 6/2015 | Scott .................... | F03D 3/0409 |
| 9,074,580 | B2 * | 7/2015 | Curtis ................... | F03D 3/02 |
| 9,494,136 | B1 * | 11/2016 | Edmiston .............. | F03D 3/061 |
| 9,896,386 | B2 * | 2/2018 | Vanderhye ............ | F03D 9/28 |
| 10,316,819 | B2 * | 6/2019 | Edmiston .............. | F03D 3/065 |
| 10,724,502 | B2 * | 7/2020 | Moore ................... | F03D 9/25 |
| 2002/0068519 | A1 * | 6/2002 | Clark .................... | F23L 17/10 454/19 |
| 2008/0217924 | A1 * | 9/2008 | Boone ................... | F03D 3/067 290/55 |
| 2008/0217925 | A1 * | 9/2008 | Boone ................... | F03D 9/28 290/55 |
| 2008/0226451 | A1 | 9/2008 | Tatar | |
| 2009/0066090 | A1 * | 3/2009 | Boone ................... | F03D 3/065 290/55 |
| 2010/0278653 | A1 * | 11/2010 | Sassow .................. | F03D 3/061 416/223 R |
| 2010/0296944 | A1 | 11/2010 | Caputi | |
| 2011/0298214 | A1 * | 12/2011 | Thompson ............ | F03D 15/20 290/44 |
| 2012/0156041 | A1 * | 6/2012 | Sassow ................. | F03D 3/064 416/176 |
| 2012/0187695 | A1 * | 7/2012 | Desplats ............... | F03D 9/25 290/55 |
| 2012/0211992 | A1 * | 8/2012 | Boone ................... | F03D 9/257 290/55 |
| 2013/0093191 | A1 * | 4/2013 | Janowski .............. | F03D 80/00 290/55 |
| 2013/0121835 | A1 * | 5/2013 | Polaski ................. | F03D 3/062 416/204 R |
| 2013/0149144 | A1 * | 6/2013 | Lau ...................... | F03D 3/005 416/1 |
| 2013/0259696 | A1 * | 10/2013 | Krivcov ................ | F03D 3/005 416/223 A |
| 2013/0264829 | A1 * | 10/2013 | Jordan, Sr. ............ | F03D 9/007 290/55 |
| 2013/0343890 | A1 * | 12/2013 | Sassow ................. | F03D 3/064 416/170 R |
| 2015/0022005 | A1 * | 1/2015 | Jordan, Sr. ............ | F03D 9/007 307/72 |
| 2018/0094618 | A1 * | 4/2018 | Edmiston .............. | F03D 3/061 |
| 2019/0242363 | A1 * | 8/2019 | Franck ................. | F03D 5/04 |

FOREIGN PATENT DOCUMENTS

| | | |
|---|---|---|
| GB | 2 386 161 A | 9/2003 |
| GB | 2498973 A | 8/2013 |
| KR | 2004-0055534 A | 6/2004 |
| KR | 2013-0027183 A | 3/2013 |
| KR | 2013-0085769 A | 7/2013 |
| WO | 2006/063833 A1 | 6/2006 |
| WO | 2006/119648 A1 | 11/2006 |
| WO | 2014/057326 A2 | 4/2014 |
| WO | 2014/175613 A1 | 10/2014 |

OTHER PUBLICATIONS

International Searching Authority, Written Opinion in International Application No. PCT/NO2018/000014, dated Oct. 24, 2018.

\* cited by examiner

ENERGY HARVESTING DEVICE

CROSS-REFERENCE TO RELATED APPLICATIONS

This patent application is the U.S. National Stage of International Patent Application No. PCT/N02018/000014, filed Jun. 29, 2018, which claims the benefit of Norwegian Patent Application No. 20171115, filed Jul. 6, 2017, which are each incorporated by reference.

TECHNICAL FIELD

The present invention relates to power/energy harvesting. More specifically the invention relates to a turbine for converting fluid flow based forces to rotational power.

BACKGROUND

A turbine is typically defined as any of various types of machines in which the kinetic energy of a moving fluid is converted into mechanical energy by causing a bladed rotor to rotate. The moving fluid may be water, steam, air, combustion products of a fuel, etc. The traditional turbine however depends on a specific moving direction of the fluid.

Related prior art is disclosed in WO2014175613, KR20130085769, GB2498973, KR1020040055534, GB840543, US2008226451A, KR1020130027183A, U.S. Pat. Nos. 5,037,268A, 4,720,239, and US2010296944.

SUMMARY

The disclosed invention relates to a power harvesting device comprising at least one rotor mounted rotatably on a corresponding fixture on a base structure. The device is at least partially submerged in a moving fluid and arranged to convert tangential components of fluid dynamic forces of the moving fluid into a first torque component onto the rotor through rotor vanes. The inventive feature are rotor blades being arranged on or between the first rotor vanes to deflect axially moving fluid into a tangential direction to create a second torque component onto the rotor in the same direction as the first torque component.

For the power harvesting device the first and second torque components provide rotational power to the rotor, which rotor is connected to and drives a power converter which outputs a power carrier to be transferred to a remote location.

In the power harvesting device the power converter and power carrier combination can be an electrical generator and electrical power, or a pump and a pressurized fluid.

The moving fluid for the power harvesting device can be water and the fluid dynamic forces then are caused by waves, current or a combination thereof; or the moving fluid can be air and the fluid dynamic forces are caused by wind.

The base structure of the power harvesting device can be one of a structure installed fixed on ground or a floating structure being moored to ground. The ground can be dry ground or the bottom of a water body.

The base structure of the power harvesting device can be arranged for additional functions beyond being base structure for the rotor(s); name it can carry wind turbines, wireless communication or navigation equipment, support equipment for offshore activities and similar.

For ease of maintenance and set-up, the rotor of the power harvesting device is connectable to or disconnectable from the base structure as substantially one single unit.

The shape of the vanes and/or the shape of the blades (6) and/or a rotational momentum of the rotor of the power harvesting device can be dynamically adjustable to optimize the amount of power absorbed from the moving fluid.

Even the power converter of the power harvesting device can have its own converter rotational momentum allowing disconnecting the rotor from the power converter when the rotor decelerates.

The disclosed invention relates also to a system comprising a plurality of power harvesting devices where the devices are connected to each other for a common transport of the power carrier to a remote location.

BRIEF DESCRIPTION OF THE DRAWING

Below, various embodiments of the invention will be described with reference to the figures, in which FIG. 1 gives a birds view of the device with bottom-fixed base structure.

DETAILED DESCRIPTION OF PREFERRED EMBODIMENTS

Figure 1:
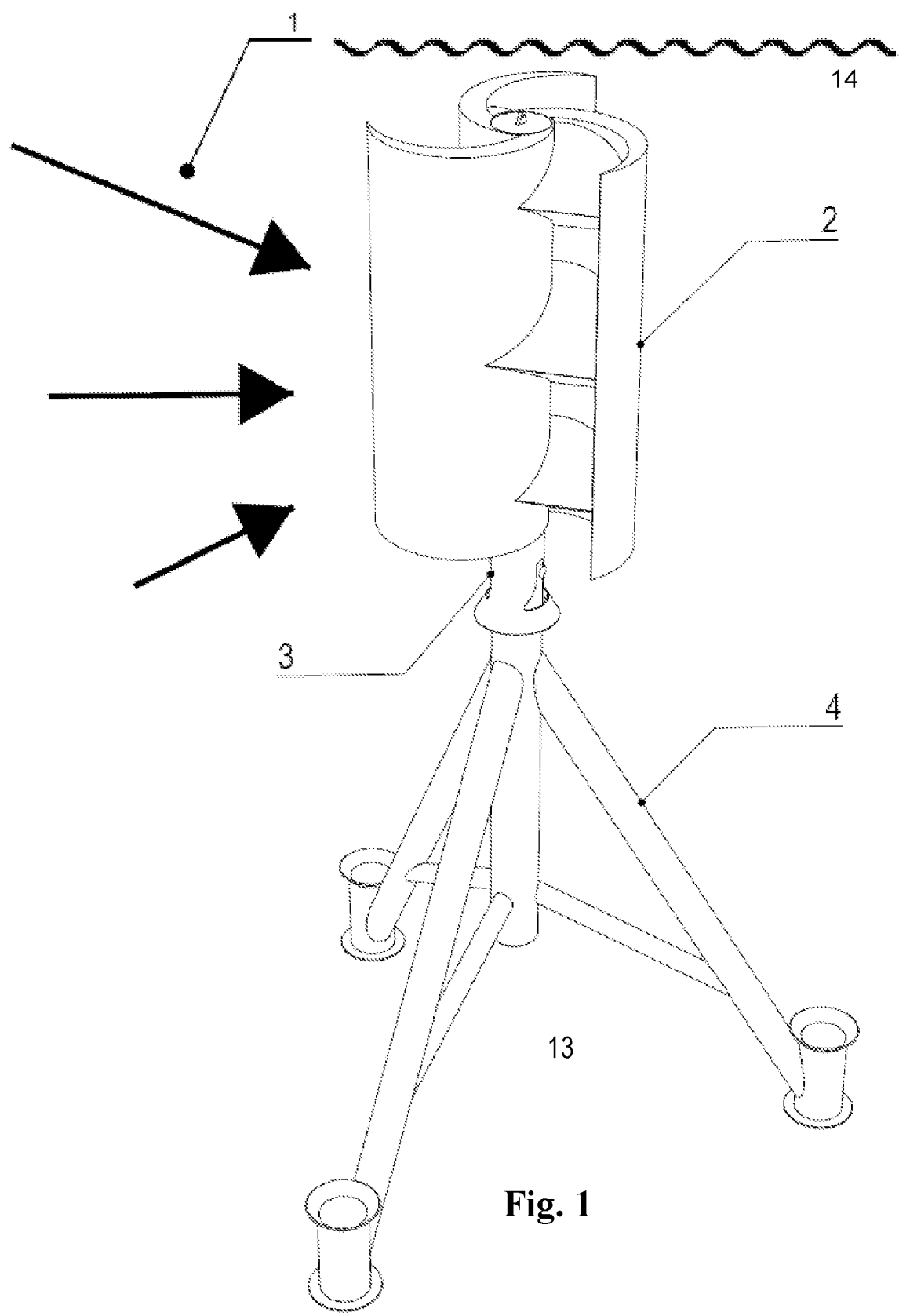
Figure 3:
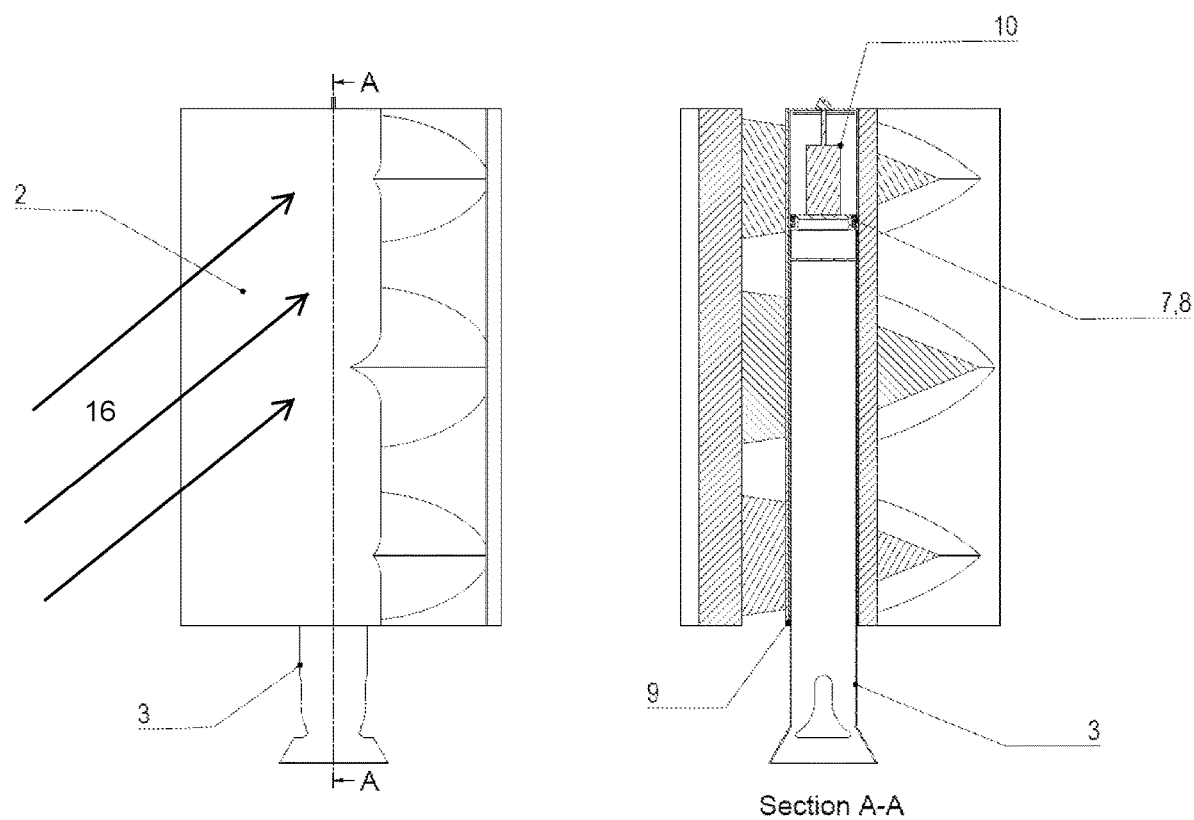
FIG. 3 shows a section view of rotor and shaft for application with generator.
Figure 4:
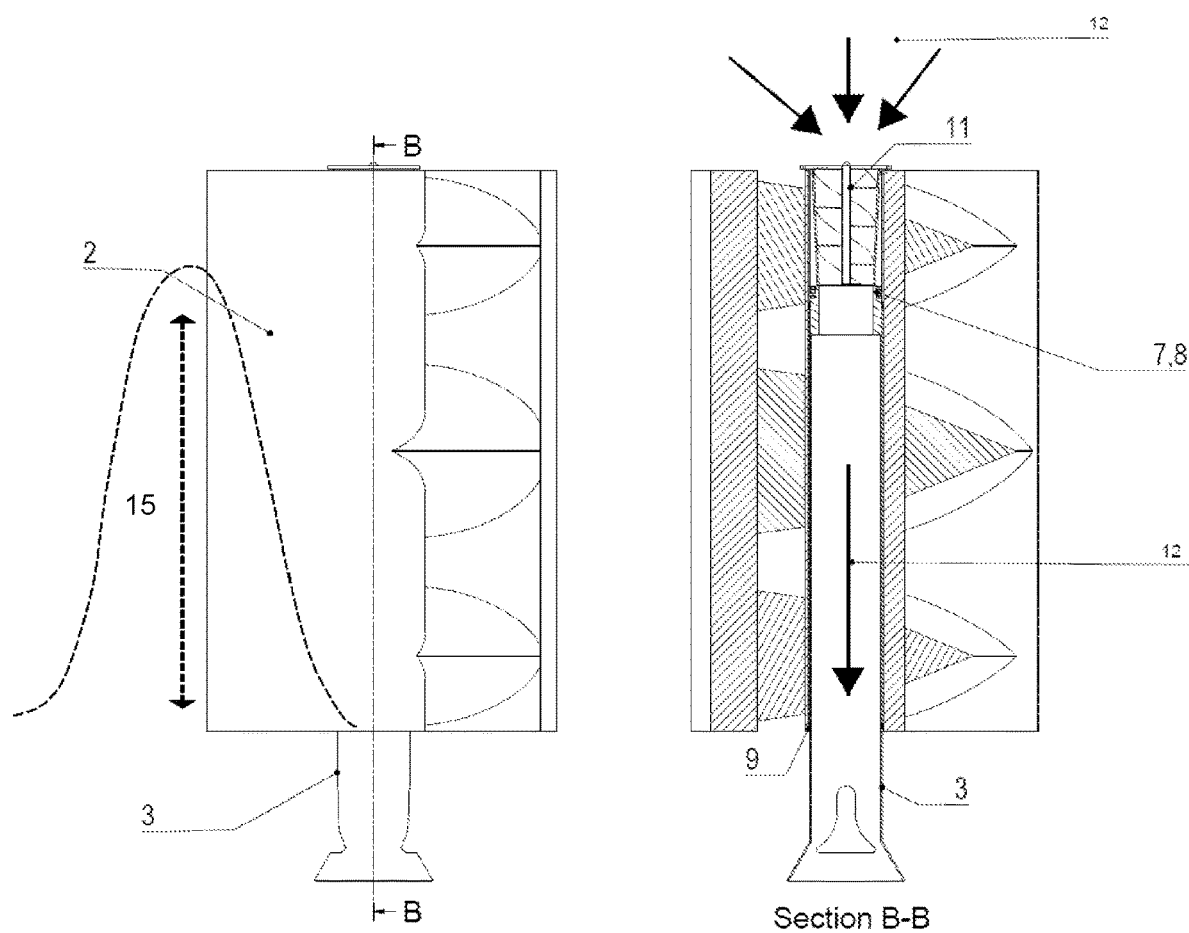
FIG. 4 shows a section view of rotor and shaft for application with fluid pump, and FIG. 5 visualizes a bottom-fixed base structure

With reference to FIG. 1, this description discloses a device that converts a relative motion between a first fluid 1 and a rotor 2 of the device into a rotation of the rotor with a design-defined, typically fixed direction (clockwise or counter-clockwise) regardless of the direction of the fluid flow. The rotation of the rotor 2 with its shaft 3 supported vertically on a base structure 4 can then be used to mechanically drive a generator to generate electric power, or a pump for moving a second 12 fluid from one place to another place. A possible location for generator 10 or pump 11 in the rotor is depicted in FIG. 3 and FIG. 4 respectively. Electric power can be sent from the device to consumers via a power cable; pumped fluid may drive a generator for electric power at the other place. Further means of using the power represented by the rotation of the rotor 2 may also be used. Instead of the second fluid 12 the ambient fluid 1 may be used. The motion of the first fluid 1 can be motion of water 14 generated by water 15 currents 16 and/or tide. A preferred embodiment of the present invention is a device placed in a water body 14 (ocean/sea/lake/river), but the device can also be placed in any other fluid, such as in air where the motion of the air is due to wind.

Figure 2:
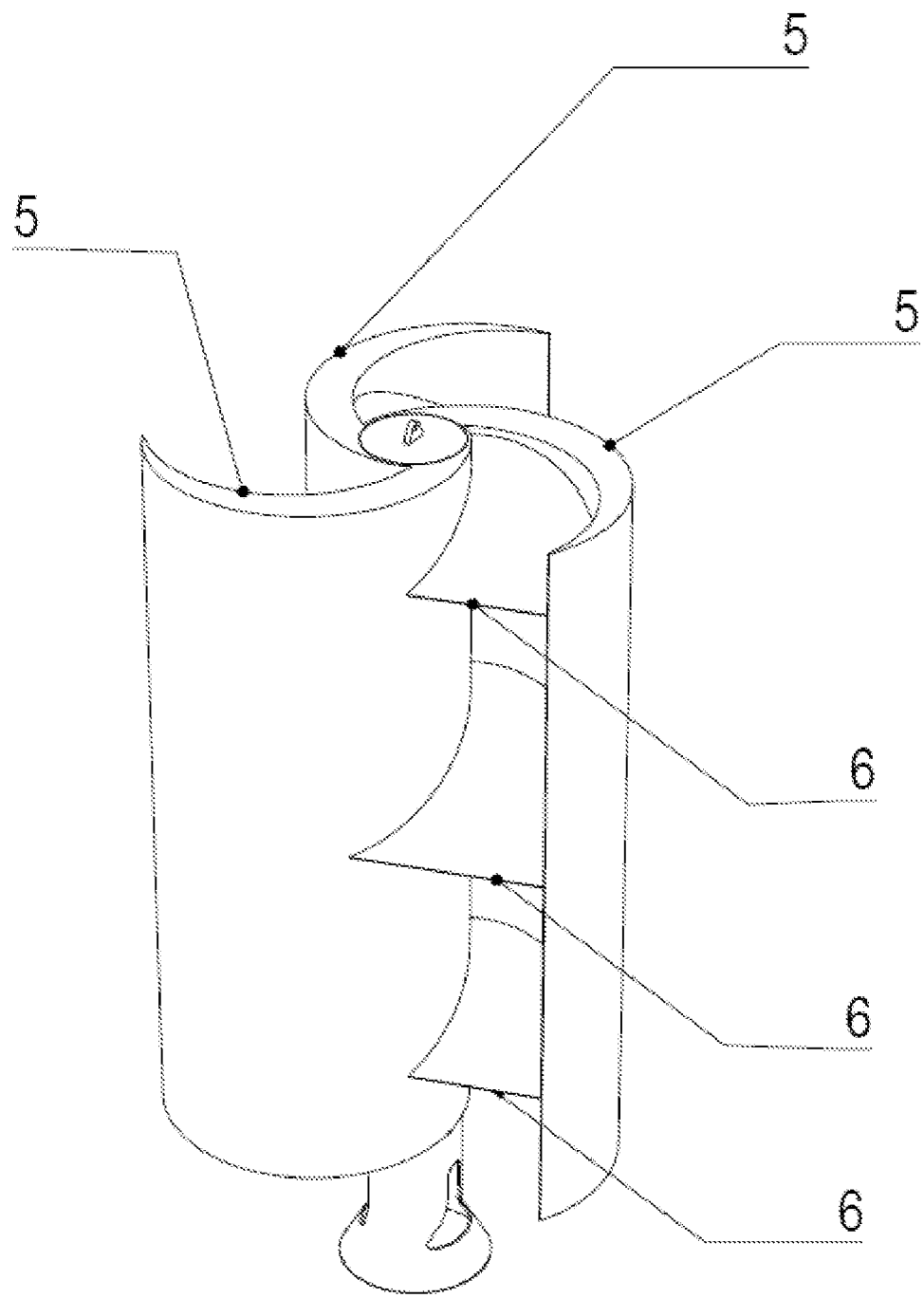
FIG. 2 shows a main component comprising rotor and rotational shaft.

With reference to FIGS. 2, 3 and 4, one of the main components of the device is the rotor 2, comprising (a) rotor vanes 5 arranged to 'catch' fluid dynamic force components directed tangentially to the rotor and to convert them into a first torque component turning the rotor, and (b) blades 6 arranged to deflect axially moving fluid into a tangential direction to create another torque component turning the rotor in the same direction as the first torque component regardless of the direction of the axial flow component. The blades with their shape for catching flow components in both axial directions can be seen in FIGS. 1-4, in cross-section on FIGS. 3 and 4.

For the number and shape of vanes 5 and blades 6 or their combined and integrated shape many different designs may be used, which all can result in a one-way rotation of the rotor 2 around the shaft 3.

A rotor without blades 6 but with vanes 5 only could resemble a prior art Savonius-type rotor or a cup-anemometer style rotor.

The amount of energy extracted from the fluid motion depends on the efficiency of the shape of the rotor 2 and its vanes 5 and blades 6. Especially the shape of the vanes 5 affects the energy take out, since the vanes 5 will move both with the moving fluid and against the moving fluid. When moving with the fluid the vanes 5 should have a bucket-like (i.e., having a semicircular arc) shape that maximizes the absorption of the kinetic energy in the moving fluid 1, while when moving against the fluid the vanes 5 should be have a shape that minimizes the absorption of the kinetic energy in the moving fluid 1. The difference in the energy absorbed by the part moving with the fluid and the energy absorbed by the part moving against the fluid substantially determines the overall efficiency of the device. Compared to a device with a fixed and unchangeable shape of the rotor 2, a higher efficiency can be obtained if the shape of the vanes 5 can be actively or passively adjusted depending on the motion direction of each vane 5 relative to the ambient fluid 1.

It may also be beneficial to shape the rotor 2 such that the kinetic energy of the moving fluid 1 is more evenly absorbed by the rotor along its length, i.e. along the shaft 3. This may especially be beneficial if the objective is to extract the energy from ocean waves 15, where the motion of the sea water 14 decreases with increasing distance from average sea level. The vanes 5 and the blades 6 should then be made larger in the lower part of the rotor 2 than in the upper part of the rotor 2.

Location of the rotor 2 relative to the still water sea surface and the wave zone is a balance of several factors, such as amount of energy to be absorbed from the waves 15 versus design issues such as wear and tear, fatigue, overloading, risk for impact with surface going vessels, other types of damages/collisions, etc.

Figure 5:
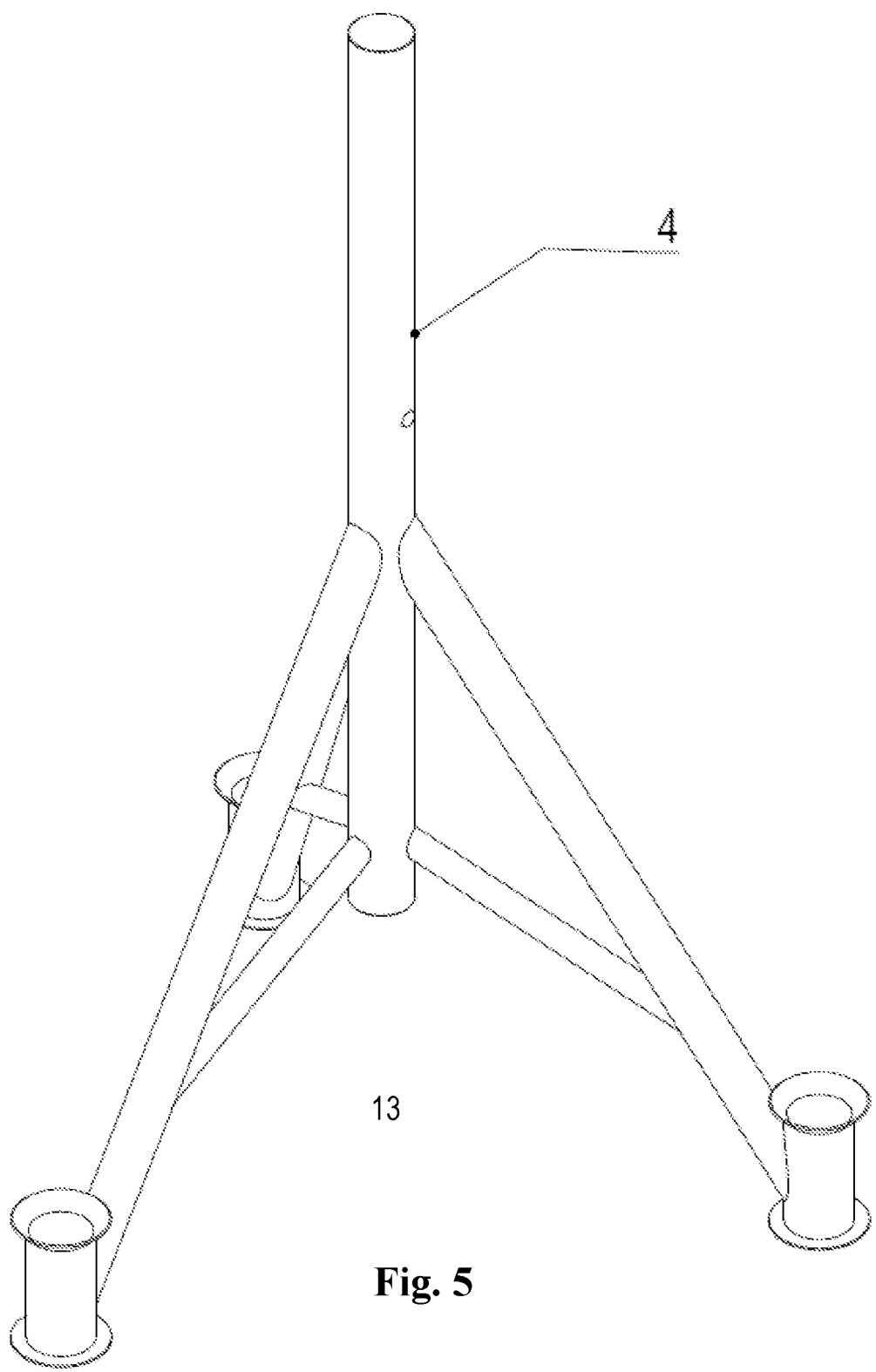

With reference to FIG. 1 and FIG. 5, the shaft 3 of the rotor is mounted on a corresponding fixture of a second main component of the device, a base structure 4. This base structure can be a bottom-fixed structure. It can be fixed to the seabed (ground 13) by driven piles or suction anchors or by gravity only. The base structure 4 can also be a floating structure, kept in position by mooring lines or tension legs or other means, such as thrusters or a combination thereof. A floating base structure can be a fully submerged structure or a surface penetrating structure such as a semi-submersible platform or ship-shaped vessel. The base structure 4, irrespective of being floating or bottom-fixed, may also have other purposes than carrying the devices described herein. These base structures may for instance also be used as a base for wind turbines or as a unit for production of oil and gas. More than one rotor can be supported by a single base structure 4 if the base structure holds a plurality of fixtures and the generators 10 are connected via power cables, or pumps 11 via fluid pipes for common transfer of fluid to a power generation facility using the combined fluid flow from all units, or other use of fluid power.

The wave force, especially, varies in strength throughout the wave period. In addition, it varies in strength from one wave cycle to the next due to variation in wave height and wave period. The rotor 2 will thus have a varying speed of rotation. This variation is reduced by the inherent design of the rotor (2), comprising both bucket-shaped vanes and blades 6, since the fluid dynamic forces from the different directions give the same rotational direction of the rotor (2) as well as not being in phase with each other.

The variation in speed of rotation for the rotor (2) can be further reduced by optimizing the mass in radial direction of the rotor 2 and mass momentum of inertia and/or the mass and mass momentum of inertia in radial direction of the shaft for the shaft-driven generator 10 or the shaft for the pump (11). A high mass momentum of inertia will slow both the acceleration and deceleration of the rotating element, and thus reduce the variation in speed of rotation.

Further, if the rotor 2 and the shaft for the shaft-driven generator 10 or the shaft for the pump is mechanically decoupled in such a way that the generator/pump shaft can rotate faster than the rotor, but not slower, then the generator or pump will notice less of the variable speed of the rotor 2, since the shaft can continue at a higher speed than the rotor 2 when the speed of the rotor 2 slows down (decelerates), but will get a new push when the rotor speeds up and catches up the shaft again. This will require a certain level for the mass momentum of inertia of the shaft; otherwise the shaft will rotate with the same speed as the rotor 2 due to the resistance from the generator when generating electric power.

Optimization of the variation in speed of rotation can be further obtained with an active or passive system for changing the mass moment of inertia in radial direction of the above mentioned components throughout the wave cycle and/or adjusted based on the slowly varying intensity of the driving forces from the moving fluid.

In order to make offshore installation and maintenance easy, it is beneficial that all the mechanical and electrical components can be mounted to the base structure 4 as a single element, or a very limited number of elements. One potential way is to assemble all the mechanical and electrical components into one unit as shown in FIGS. 2, 3 and 4. This unit can then be assembled ashore and may comprise rotor 2, shaft 3 with associated axial bearings 7 and radial bearings 8, 9, and power generator 10 and cable or—alternatively—pump 11 and pipes. This unit can then be installed on top of the base structure 4 with one single lift, where it is locked to the base with automatic latching devices or manual locking devices operated by divers or a Remotely Operated Vehicle (ROV). This unit can then also be lifted off the base structure 4 for easy and dry maintenance, either onboard a surface vessel or ashore.

REFERENCE NUMERALS

1 Moving fluid, water, air
2 Rotor with vanes 5 and blades 6
3 Axis of rotation, rotor shaft
4 Base structure
5 Vane part/shape of the rotor 2 that causes rotation of the rotor from fluid moving transverse to the axis of rotation
6 Blade; part/shape of the rotor 2 that causes rotation of the rotor from fluid moving in longitudinal direction of the axis of rotation
7 Axial bearing
8 Upper radial bearing
9 Lower radial bearing
10 Generator, gear and gearbox assembly
11 Pump
12 Pumped fluid
13 Ground
14 Water, water body
15 Waves
16 Current

The invention claimed is:

1. A power harvesting device comprising at least one rotor, rotating around a vertical shaft, mounted on a corresponding fixture on a base structure, the power harvesting device being at least partially submerged in moving water and arranged to convert tangential components of fluid dynamic forces caused by waves, current or a combination of waves and current, into a first torque component onto the at least one rotor through bucket-shaped rotor vanes, wherein bucket-shaped rotor blades each have a leading edge extending from an inner surface of a bucket-shaped rotor vane to an outer surface of an adjacent bucket-shaped rotor vane, and the bucket-shaped rotor blades are arranged on or between the bucket-shaped rotor vanes to deflect axially moving water, caused by waves, current or a combination of waves and current, into a tangential direction independent of the direction of the axial flow, to create a second torque component onto the at least one rotor in the same direction as the first torque component.

2. The power harvesting device according to claim 1, wherein the first and second torque components provide rotational power to the at least one rotor, the at least one rotor being connected to and driving a generator outputting power to be transferred to a remote location.

3. The power harvesting device according to claim 1, wherein the first and second torque components provide rotational power to the at least one rotor, the at least one rotor being connected to, and driving, a pump, outputting a pressurized fluid.

4. The power harvesting device according to claim 1, wherein the base structure is a structure installed fixed on a ground or is moored to the ground, the ground being dry ground or a bottom of a water body.

5. The power harvesting device according to claim 1, wherein the at least one rotor is connectable to and disconnectable from said base structure as substantially one single unit.

* * * * *